(12) United States Patent
Yu et al.

(10) Patent No.: US 12,257,884 B2
(45) Date of Patent: Mar. 25, 2025

(54) VEHICLE DECORATION PART, VEHICLE WINDOW GLASS ASSEMBLY AND MANUFACTURING PROCESS AND MOLDING DEVICE THEREOF

(71) Applicant: SAINT-GOBAIN GLASS FRANCE, Courbevoie (FR)

(72) Inventors: Buyin Yu, Shanghai (CN); Xinqiao Gao, Shanghai (CN); Romain Gonnet, Compiegne (FR); Camille Dassonville, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 894 days.

(21) Appl. No.: 17/274,683

(22) PCT Filed: Nov. 7, 2019

(86) PCT No.: PCT/CN2019/116143
§ 371 (c)(1),
(2) Date: Mar. 9, 2021

(87) PCT Pub. No.: WO2020/094083
PCT Pub. Date: May 14, 2020

(65) Prior Publication Data
US 2022/0032753 A1      Feb. 3, 2022

(30) Foreign Application Priority Data

Nov. 9, 2018   (CN) .......................... 201811329941.4

(51) Int. Cl.
*B60J 10/265*     (2016.01)
*B29C 45/14*      (2006.01)
(Continued)

(52) U.S. Cl.
CPC ....... *B60J 10/265* (2016.02); *B29C 45/14065* (2013.01); *B29C 45/14434* (2013.01);
(Continued)

(58) Field of Classification Search
None
See application file for complete search history.

(56) References Cited

U.S. PATENT DOCUMENTS

2014/0044907 A1    2/2014   Kondo

FOREIGN PATENT DOCUMENTS

| CN | 204196802 U | 3/2015 |
|---|---|---|
| CN | 104477106 A | 4/2015 |

(Continued)

OTHER PUBLICATIONS

Machine English translation of CN206141464, Accessed Nov. 9, 2023 (Year: 2017).*

(Continued)

*Primary Examiner* — Jacob T Minskey
*Assistant Examiner* — Adrianna N Konves
(74) *Attorney, Agent, or Firm* — Pillsbury Winthrop Shaw Pittman LLP

(57) ABSTRACT

A vehicle decoration part is arranged in a pillar sheet metal and/or a window frame of a vehicle and includes a decoration body and a decoration film attached to surface(s) of the decoration body, wherein the material of the decoration body is metal, and the material of the decoration film is flexible material and forms decoration surface. The vehicle decoration part possesses stable performance and can meet the user's requirements of different appearances. When the vehicle decoration part is applied to a vehicle window glass assembly, bad appearance caused by bumping or scraping in molding process and daily use process can be avoided. The molding device and the manufacturing process of the vehicle (Continued)

window glass assembly are easy to realize, economical in cost and wide in application prospect.

15 Claims, 2 Drawing Sheets

(51) Int. Cl.
    *B29C 45/73*     (2006.01)
    *B60J 10/00*     (2016.01)
    *B60R 13/04*     (2006.01)
    *B29K 709/08*     (2006.01)
    *B29L 31/30*     (2006.01)

(52) U.S. Cl.
    CPC .............. *B29C 45/73* (2013.01); *B60J 10/45* (2016.02); *B60R 13/04* (2013.01); *B29C 2045/14114* (2013.01); *B29K 2709/08* (2013.01); *B29L 2031/30* (2013.01)

(56) References Cited

FOREIGN PATENT DOCUMENTS

| | | |
|---|---|---|
| CN | 206141464 U | 5/2017 |
| CN | 108068270 A | 5/2018 |
| EP | 2 687 393 A1 | 1/2014 |
| JP | 2006-117222 A | 5/2006 |
| JP | 2009-248342 A | 10/2009 |
| JP | 2010-215134 A | 9/2010 |
| JP | 2016-539026 A | 12/2016 |
| KR | 10-2013-0117438 A | 10/2013 |
| WO | WO 2015/074579 A1 | 5/2015 |

OTHER PUBLICATIONS

Machine English translation of CN108068270, Accessed Mar. 7, 2024 (Year: 2018).*
Machine English translation of CN206141464, Accessed Mar. 7, 2024 (Year: 2017).*
Office Action and Search Report as issued in Russian Patent Application No. 2021115245, dated Oct. 25, 2021.
Extended European Search Report as issued in European Patent Application No. 19882701.6, dated Jun. 23, 2022.
Examination Report as issued in Indian Patent Application No. 202117003390, dated Oct. 17, 2022.
Notice of Reasons for Refusal as issued in Japanese Patent Application No. 2021-516927, dated Sep. 12, 2023.
International Search Report as issued in International Patent Application No. PCT/CN2019/116143, dated Feb. 1, 2020.
Notice of Preliminary Rejection as issued in Korean Patent Application No. 10-2021-7013526, dated May 31, 2024.
Notice of Reasons for Refusal as issued in Japanese Patent Application No. 2023-208759, dated Oct. 15, 2024.

* cited by examiner

VEHICLE DECORATION PART, VEHICLE WINDOW GLASS ASSEMBLY AND MANUFACTURING PROCESS AND MOLDING DEVICE THEREOF

CROSS-REFERENCE TO RELATED APPLICATIONS

This application is the U.S. National Stage of PCT/CN2019/116143, filed Nov. 7, 2019, which in turn claims priority to Chinese patent application number 201811329941.4 filed Nov. 9, 2018. The content of these applications are incorporated herein by reference in their entireties.

TECHNICAL FIELD

The present disclosure generally relates to the field of production of vehicle components. More particularly, it relates to a vehicle decoration part, a vehicle window glass assembly having the vehicle decoration part and a manufacturing process thereof, and a molding device for manufacturing the vehicle window glass assembly.

BACKGROUND

With the rapid development of the automotive industry, the appearances of vehicles are constantly changed to meet the preferences of different consumers at all levels. In order to improve the appearance quality of the vehicles, more and more manufacturers use decoration strips attached on exposed sheet metals of vehicle doors and window frames for decoration. Traditional decoration strips are generally bright strips made of plastic or metal, and are used for covering pillar (A-pillar, B-pillar and C-pillar) sheet metals and/or window frames of vehicle bodies to increase the gloss of the outer surfaces, thus making the vehicles appear more luxurious and sporty.

Currently, bright decoration strips are usually manufactured by pigment spraying process or chromium plating process, and have high-gloss or matt silver appearances. The color of the bright decoration strips is monotonous and there are not many choices for the color. Therefore, the "black and bright" effect that comes into being in this context is widely favored by consumers. In some solutions, the above effect can be achieved by the co-extrusion of plastic and surface film or the integral injection molding of high gloss black material. However, plastic decoration strips do not completely match the molding process for window frames. In particular, the plastic decoration strips cannot adapt to the high temperature during the integral injection molding process and thus would be damaged. In addition, such a process is complicated and costly. In some solutions, aluminum decoration strips are anodized to achieve black appearances. However, such a process not only has a high cost but also causes heavy pollution. Moreover, since the aluminum decoration strips are prone to be deformed and have high brittleness, they can hardly be fixed into the cavity of the mold and thus integral injection molding cannot be performed.

SUMMARY

The object of the present disclosure is to solve the above problems in the prior art, and to provide a vehicle decoration part which can obtain a desired aesthetic appearance at a low cost, and can well adapt to the process for manufacturing vehicle window components, thus improving product yield and avoiding the occurrence of appearance defects during use.

To this end, according to an aspect of the present disclosure, a vehicle decoration part for arranging in a pillar sheet metal and/or a window frame of a vehicle is provided. The vehicle decoration part comprises a decoration body and a decoration film attached to surface(s) of the decoration body. The material of the decoration body is metal, and the material of the decoration film is flexible material and forms decoration surface.

According to the above technical concept, the present disclosure may further include any one or more of the following optional embodiments.

In some optional embodiments, the decoration body is made of stainless steel.

In some optional embodiments, the decoration film is made of polymer.

In some optional embodiments, the decoration film is made of polyvinylidene fluoride.

In some optional embodiments, the decoration film has matt surface, high-gloss surface or dermatoglyphic surface.

In some optional embodiments, the decoration film has black appearance.

In some optional embodiments, the decoration film is laminated, coated or bonded to the surface of the decoration body.

In some optional embodiments, the thickness of the decoration film is 0.01~0.2 mm.

According to another aspect of the present disclosure, a vehicle window glass assembly is provided. The vehicle window glass assembly comprises a glass body and an encapsulation covering periphery of the glass body. The vehicle window glass assembly further comprises a vehicle decoration part described above, and the vehicle decoration part is attached to the encapsulation on at least one peripheral edge of the glass body.

In some optional embodiments, the vehicle decoration part is integrally injection-molded with the encapsulation or embedded in the encapsulation.

In some optional embodiments, the encapsulation is made of thermoplastic polymer.

In some optional embodiments, the thermoplastic polymer is selected from thermoplastic vulcanized rubber, polyvinyl chloride and polypropylene.

In some optional embodiments, the vehicle window comprises front windshield, rear windshield, front door glass window, rear door glass window, sunroof or quarter window.

According to another aspect of the present disclosure, a process for manufacturing a vehicle window glass assembly is provided. The vehicle window glass assembly comprises a glass body and an encapsulation covering periphery of the glass body. The vehicle window glass assembly further comprises a vehicle decoration part described above. The process comprises following steps:
  a. placing the vehicle decoration part into a cavity of a mold and enabling surface of the vehicle decoration part to be adhered to inner wall of the cavity;
  b. placing the glass body which is cut and shaped into the cavity and fixing the glass body in place;
  c. injecting thermoplastic polymer into the cavity to form the encapsulation, and enabling the vehicle decoration part to be integrally molded with the encapsulation on at least one peripheral edge of the glass body.

In some optional embodiments, further comprises a step of cooling the cavity in the step c, so that the cavity temperature is controlled at 10° C.~26° C.

In some optional embodiments, the step of cooling is performed by a cooling device matched with the cavity of the mold.

In some optional embodiments, the step of cooling is further performed by providing a cooling member on the inner wall of the cavity to which the vehicle decoration part is adhered.

According to still another aspect of the present disclosure, a molding device for manufacturing a vehicle window glass assembly is provided. The vehicle window glass assembly comprises a glass body and an encapsulation covering periphery of the glass body. The vehicle window glass assembly further comprises a vehicle decoration part described above. The molding device comprises a mold having a cavity. A cooling member is provided on inner wall of the cavity to which the vehicle decoration part is adhered.

In some optional embodiments, the cooling member is attached to the inner wall of the cavity to which the vehicle decoration part is adhered, or a contact cavity is formed on the inner wall of the cavity from a material having high thermal conductivity.

In some optional embodiments, the cooling member is made of metal or alloy.

In some optional embodiments, the cooling member is made of beryllium copper.

In some optional embodiments, the molding device further comprises a cooling device matched with the cavity of the mold.

In some optional embodiments, the cooling device is water cooling device.

The vehicle decoration part of the present disclosure has more stable performance than the decoration part made of conventional plastic material or obtained by anodization of metal. The metal decoration body has sufficient rigidity and is adapted to be firmly attached to vehicle components, such as window frames. In addition, by using decoration films with different surface properties, the user's requirements of different appearances, such as color, scratch resistance, UV protection and the like, can be met. The vehicle window glass assembly having the vehicle decoration part can be manufactured easily, in particular, can be manufactured via the molding device of the present disclosure by the manufacturing process of the present disclosure which has high production efficiency and is easy to control, and can be widely used in a variety of applications.

BRIEF DESCRIPTION OF THE DRAWINGS

Other features and advantages of the present disclosure will be better understood from the following preferred embodiments described in detail with reference to the accompany drawings, in which.

DETAILED DESCRIPTION

Figure 1:
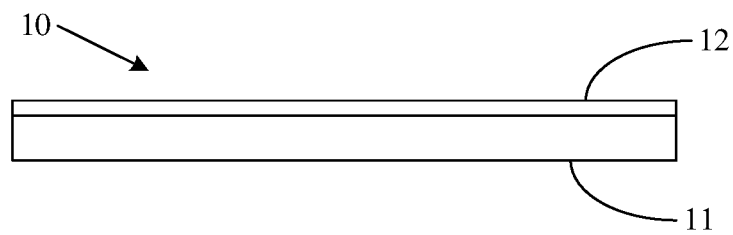
FIG. 1 is a schematic view showing the structure of a vehicle decoration part according to an embodiment of the present disclosure.

The implementation and usage of the embodiments will be discussed in detail below. However, it should be understood that the specific embodiments discussed herein are merely illustrative of specific ways to implement and use the present disclosure without limiting the scope of the present disclosure. In the description for the structural positions of various components, representations of directions such as "upper", "lower", "top" and "bottom" are not absolute, but relative. When the various components are arranged as shown in the drawings, these representations of directions are appropriate. However, when the positions of the various components in the drawings are changed, these representations of directions are also changed accordingly.

Herein, "outer" and "inner" are directions with respect to the vehicle body. "Outer" refers to a direction away from the vehicle body, and "inner" refers to a direction facing the vehicle body.

Herein, "glass" refers to a transparent semi-solid, semi-liquid matter which is a silicate non-metallic material. During melting, it forms a continuous network structure. During cooling, its viscosity would be gradually increased and hardened without crystallizing. "Plastic" refers to a material which is formed by the polymerization of monomer raw materials via synthesis or condensation reactions, and the major component of the plastic is high molecular polymer.

Herein, "polymer" includes thermosetting polymer and thermoplastic polymer. The thermosetting polymer is generated from prepolymer via a curing reaction in the presence of a curing agent. The thermoplastic polymer is a polymer which can be heated and melted repeatedly and molded in a softened state or flow state and can maintain the shape of the mold after cooling. Usually, there is no need to use a curing agent in the molding process of the thermoplastic polymer.

According to the concept of the present disclosure, the object of the present disclosure is to overcome common defects in the prior heat treatment process for bright decoration strips of the vehicle (for example, the bright decoration strips are prone to be deformed and corroded, and have high brittleness), and to improve the appearance of the vehicle body and the competitiveness of the vehicle.

Referring first to FIG. 1, the present disclosure provides a vehicle decoration part 10 that can be disposed in a pillar sheet metal and/or a window frame of a vehicle. The vehicle decoration part includes a decoration body 11 and a decoration film 12 attached to surface(s) of the decoration body 11. The decoration body 11 is made of metal. The material of the decoration film 12 is flexible material, and the decoration film 12 constitutes outer surface of the decoration part (that is, a decoration surface) after being mounted to the vehicle body.

In some embodiments, the decoration body 11 may be made of stainless steel to achieve low cost and high rigidity. The decoration film 12 may be made of high temperature resistant polymer, such that the decoration film 12 can be integrally attached to a vehicle component (for example, by injection molding), thus simplifying the production process and improving production efficiency. In some embodiments, the decoration film 12 may be made of polyvinylidene fluoride (PVDF) having a melting point of 170° C., a thermal decomposition temperature of 316° C. or higher, and a long-term use temperature of −40~150° C., which can effectively solve the problem that the decoration film is prone to be melted and worn during the injection molding process. However, other polymers with similar properties are also feasible.

In order to obtain different appearances to meet the needs of different users, the decoration films may be provided with surfaces of different colors, for example, optional colors of bright decoration strips, such as black, gray, and even silver. Likewise, the decoration films may have surfaces with different appearances, for example, optional surfaces such as matt surface, high gloss surface and dermatoglyphic surface. In some embodiments, the decoration film may be a black high gloss PVDF film.

In some embodiments, the decoration film has a thickness of 0.01~0.2 mm, such as about 0.05 mm. Thus, the presence of the decoration film would not significantly increase the thickness of the decoration body, and the decoration film is applicable to most existing decoration bodies. The decoration film may be attached to the decoration body by laminating, coating or adhesive bonding. In the laminating process, a conventional film laminating device may be used to attach the decoration film to the decoration body; the coating manner includes but is not limited to drop coating, dip coating, brush coating, spray coating, vapor deposition, electroplating, etc.; in the adhesive bonding process, adhesives, such as pressure sensitive adhesive, may be used to achieve a reliable bond between the decoration film and the decoration body.

Figure 2:
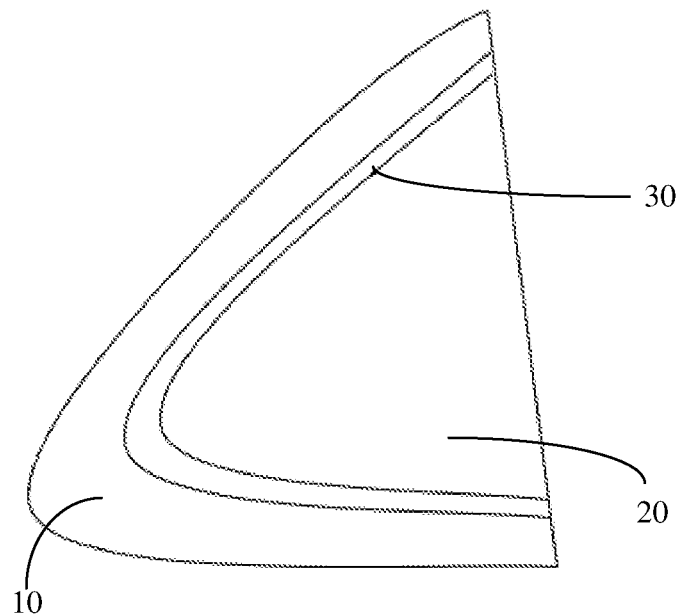
FIG. 2 is a schematic view showing the application of the vehicle decoration part of the present disclosure to a vehicle window glass.

FIG. 2 shows an embodiment in which the vehicle decoration part of the present disclosure is applied to a vehicle body, and shows a vehicle window glass assembly of a rear quarter window. The vehicle window glass assembly includes a glass body 20 and an encapsulation 30 covering periphery of the glass body 20. The vehicle decoration part 10 is attached to the encapsulation 30 on at least one peripheral edge of the glass body 20. It should be understood that the encapsulation, also referred to as "sealing material", refers to a material injected into the mold in a molten state during the injection molding process of the vehicle window glass assembly. Generally, the encapsulation is thermoplastic polymer and has a sealing function. The thermoplastic polymer may be, for example, rubber, composite material or other materials that may be used for sealing, including but not limited to ethylene propylene diene monomer, thermoplastic vulcanizate (TPV), fluororubber, silicone rubber, styrene butadiene rubber, nitrile rubber, Polyvinyl chloride (PVC), polypropylene (PP), urethane rubber, acrylate rubber, styrenic thermoplastic elastomer (SEBS+PP), polysulfide rubber, and polymethyl methacrylate (PMMA). Moreover, although the rear quarter window is illustrated and described as an example, the window includes, but is not limited to, front windshield, rear windshield, front door glass window, rear door glass window, sunroof and the like.

Figure 3:
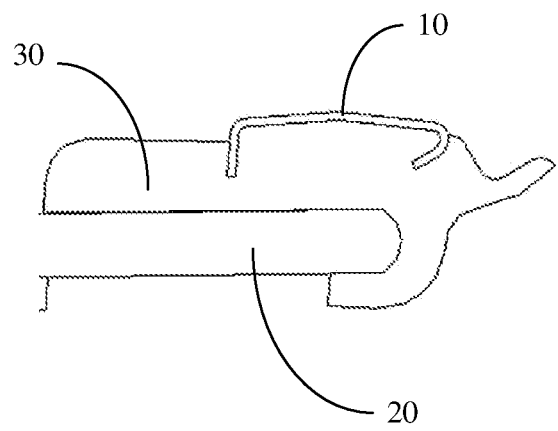
FIG. 3 is a schematic view showing a vehicle window glass assembly molded according to an embodiment of the present disclosure.
Figure 4:
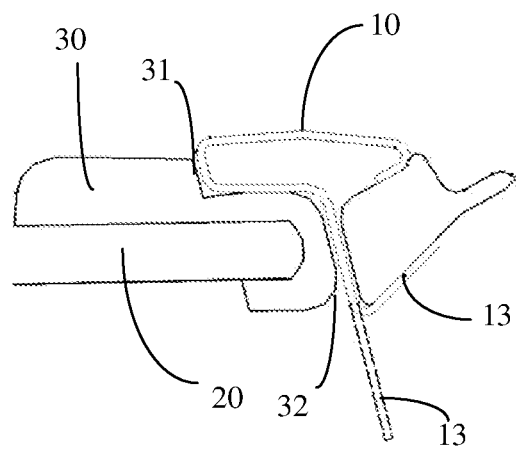
FIG. 4 is a schematic view showing a vehicle window glass assembly formed according to another embodiment of the present disclosure.

According to actual needs, the vehicle decoration part 10 may be integrally molded with the encapsulation 30 by injection molding or embedded in the encapsulation 30. In particular, referring to FIGS. 3 and 4, FIG. 3 shows a schematic view of the vehicle window glass assembly molded in an integral injection molding manner. The vehicle decoration part 10 is integrally molded with the glass 20 and the encapsulation 30 in the injection molding process of the vehicle window glass assembly. FIG. 4 shows a schematic view of the vehicle window glass assembly formed in an embedding manner. The vehicle window glass 20 is injection-molded with the encapsulation 30 in advance, and then the vehicle decoration part 10 is mounted into a notch 31 provided in the encapsulation 30. The vehicle decoration part 10 has a distal end 13 that can be embedded into a gap 32 of the encapsulation 30. When embedded in place, the distal end 13 can be bent and in close contact with the encapsulation 30, thereby completing the assembly of the vehicle window glass assembly. The unbent distal end 13 is shown in dashed lines in FIG. 4.

In terms of production process and efficiency, the vehicle decoration part is preferably integrated into the vehicle window glass assembly in an integral molding manner, which helps avoid assembly defects of the vehicle decoration part and the problem that cracks or upwarps might occur in the decoration part to affect the appearance and use after the vehicle window glass assembly is installed in the vehicle.

In an embodiment in which the vehicle window glass assembly includes an integrally injection-molded vehicle decoration part, the decoration film of the vehicle decoration part according to the present disclosure is softer than the decoration body, and the injection molding material injected into the cavity of the mold to form an encapsulation has a high temperature, usually higher than 180° C., while the melting point of the decoration film is low. Therefore, in order to prevent the high temperature environment affecting the decoration film during the injection molding process (for example, causing the decoration film to be prone to be scratched and melted, etc.), in the molding device provided by the present disclosure, a cooling member is advantageously provided on the inner wall of the cavity to which the vehicle decoration part is adhered.

Figure 5:
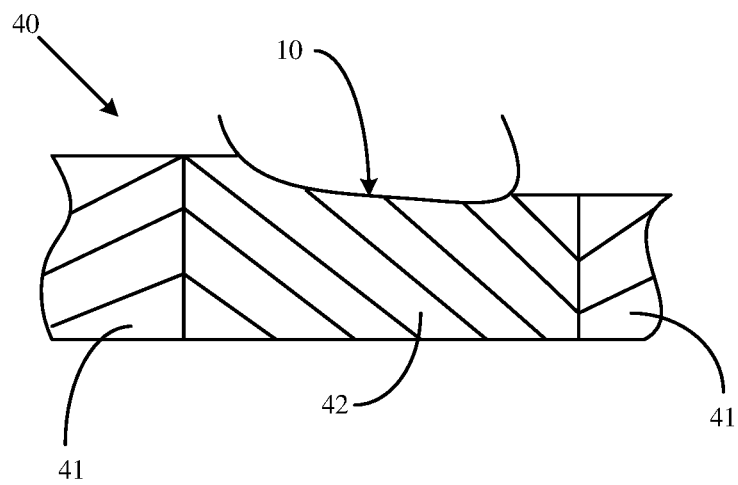
FIG. 5 is a schematic partial cross-sectional view of a molding device for manufacturing the vehicle window glass assembly according to an embodiment of the present disclosure.

In some embodiments, the cooling member may be made of metal or alloy having high thermal conductivity, including but not limited to beryllium copper which has a thermal conductivity equal to or greater than 105 W/m·K (20° C.) and is particularly suitable for the inner insert of the injection molding mold. In some embodiments, the cooling member may be attached to the inner wall of the cavity, and the attachment manner includes, but is not limited to, mechanical connecting or adhesive bonding. In some embodiments, the area of the cavity in contact with the vehicle decoration part may be made of a material having excellent thermal conductivity to form a cooling member. For example, as shown in FIG. 5, in the cavity 40 of the mold, the inner wall 41 in contact with the glass and the encapsulation may be made of a conventional material, and the area 42 in contact with the vehicle decoration part 10 may be made of a material such as beryllium copper to form a separate contact cavity so as to facilitate heat dissipation in this area.

Preferably, the molding device further includes a cooling device matched with the cavity of the mold. In some embodiments, the cooling device is a water cooling device. It should be understood that any other feasible cooling device may be employed depending on surrounding environment, space, cost and the like.

A manufacturing process for applying the vehicle decoration part to the vehicle window glass assembly will be outlined below. The manufacturing process includes following steps:

Step a. placing the vehicle decoration part into a cavity of a mold and enabling the decoration surface to be adhered to inner wall of the cavity which may have the above-mentioned contact cavity made of, for example, beryllium copper;

Step b. placing a glass body which is cut and shaped into the cavity and fixing the glass body in place;

Step c. injecting thermoplastic polymer into the cavity to form an encapsulation, and enabling the vehicle decoration part to be integrally molded with the encapsulation on at least one peripheral edge of the glass body.

Further, a step of cooling the cavity is further included in step c, so that the cavity temperature is controlled at 10° C.~26° C. (for example, below 25° C.) to prevent the decoration film from being melted and being prone to be scratched at a higher temperature. This temperature control may be performed by a cooling device matched with the cavity of the mold, such as the water cooling device described above. It should be understood that the process for manufacturing a vehicle window glass assembly further includes a step of monitoring the injection molding process, especially monitoring the cavity temperature. In addition, it is necessary to monitor and adjust the degree of mold clamping to enabling the vehicle decoration part to be in full contact with the cavity, so as to prevent the injection molding material having a high temperature from leaking and having adverse effect on the appearance of the vehicle decoration part.

The vehicle decoration part according to the present disclosure possesses stable performance and can meet the user's requirements of different appearances. When the vehicle decoration part is applied to a vehicle window glass assembly, bad appearance caused by bumping or scraping in molding process and daily use process can be avoided. The molding device and the manufacturing process of the vehicle window glass assembly according to the present disclosure are easy to realize, economical in cost and wide in application prospect.

Here, it should be understood that the embodiments shown in FIGS. 1 to 5 only show the optional shapes, sizes and arrangements of various optional components of the vehicle decoration part, the vehicle window glass assembly and the molding device according to the present disclosure which are merely illustrative and not restrictive. Other shapes, sizes, and arrangements can be employed without departing from the spirit and scope of the present disclosure. In the various embodiments mentioned above, the glass body may be selected from ordinary glass, tempered glass, ultra-thin glass, flat glass, curved glass and the like. It can be understood that the shape, size and the like of the glass can be changed according to different applications and different requirements for the appearance.

The technical content and technical features of the present disclosure have been disclosed above. However, it will be understood that those skilled in the art can make various changes and improvements to the above disclosed concept, but all the changes and improvements fall within the scope of protection of the present disclosure. The description of the above embodiments is illustrative and not restrictive, and the scope of protection of the present disclosure is defined by the claims.

The invention claimed is:

1. A process for manufacturing a vehicle window glass assembly, the vehicle window glass assembly comprising a glass body and an encapsulation covering periphery of the glass body, wherein the vehicle window glass assembly further comprises a vehicle decoration part, the vehicle decoration part comprising a decoration body and a decoration film attached to one or more surfaces of the decoration body, a material of the decoration body being metal, and a material of the decoration film being flexible material and forming a decoration surface, and the process for manufacturing comprising:

a. placing the vehicle decoration part into a cavity of a mold and enabling surface of the vehicle decoration part to be adhered to inner wall of the cavity;
b. placing the glass body which is cut and shaped into the cavity and fixing the glass body in place;
c. injecting thermoplastic polymer into the cavity to form the encapsulation, and enabling the vehicle decoration part to be integrally molded with the encapsulation on at least one peripheral edge of the glass body,
   wherein the process further comprises cooling the cavity in said injecting thermoplastic polymer into the cavity to form the encapsulation, and enabling the vehicle decoration part to be integrally molded with the encapsulation on at least one peripheral edge of the glass body, and the cooling is performed by providing a cooling member on the inner wall of the cavity that is adhered to the vehicle decoration part.

2. The process for manufacturing a vehicle window glass assembly according to claim 1, wherein through cooling the cavity in said injecting thermoplastic polymer into the cavity to form the encapsulation, and enabling the vehicle decoration part to be integrally molded with the encapsulation on at least one peripheral edge of the glass body, the cavity temperature is controlled at a temperature between 10° C. and 26° C.

3. The process for manufacturing a vehicle window glass assembly according to claim 2, wherein the cooling is further performed by a cooling device associated with the cavity of the mold.

4. The process for manufacturing a vehicle window glass assembly according to claim 1, wherein the vehicle decoration part of the vehicle window glass assembly is arranged in a pillar sheet metal and/or a window frame of a vehicle, and the vehicle decoration part is attached to the encapsulation on at least one peripheral edge of the glass body.

5. The process for manufacturing a vehicle window glass assembly according to claim 4, wherein the vehicle decoration part is integrally molded with the encapsulation or embedded in the encapsulation.

6. The process for manufacturing a vehicle window glass assembly according to claim 4, wherein the encapsulation is made of thermoplastic polymer.

7. The process for manufacturing a vehicle window glass assembly according to claim 6, wherein the thermoplastic polymer is selected from thermoplastic vulcanized rubber, polyvinyl chloride and polypropylene.

8. The process for manufacturing a vehicle window glass assembly according to claim 4, wherein the vehicle window comprises front windshield, rear windshield, front door glass window, rear door glass window, sunroof or quarter window.

9. The process for manufacturing a vehicle window glass assembly according to claim 4, wherein the decoration body of the vehicle decoration part is made of stainless steel.

10. The process for manufacturing a vehicle window glass assembly according to claim 4, wherein the decoration film of the vehicle decoration part is made of polymer.

11. The process for manufacturing a vehicle window glass assembly according to claim 10, wherein the decoration film is made of polyvinylidene fluoride.

12. The process for manufacturing a vehicle window glass assembly according to claim 4, wherein the decoration film of the vehicle decoration part has matte surface, high-gloss surface or dermatoglyphic surface.

13. The process for manufacturing a vehicle window glass assembly according to claim 4, wherein the decoration film of the vehicle decoration part has black appearance.

14. The process for manufacturing a vehicle window glass assembly according to claim 4, wherein the decoration film of the vehicle decoration part is laminated, coated or bonded to the surface of the decoration body.

15. The process for manufacturing a vehicle window glass assembly according to claim 4, wherein the thickness of the decoration film of the vehicle decoration part is between 0.01 mm and 0.2 mm.

* * * * *